(12) United States Patent
Prybutok

(10) Patent No.: US 7,504,439 B2
(45) Date of Patent: Mar. 17, 2009

(54) HYDROPHOBATION OF MELAMINE FOAM

(75) Inventor: Jarred M. Prybutok, Wilmington, DE (US)

(73) Assignee: Polymer Technologies, Inc., Newark, DE (US)

(*) Notice: Subject to any disclaimer, the term of this patent is extended or adjusted under 35 U.S.C. 154(b) by 285 days.

(21) Appl. No.: 11/263,699

(22) Filed: Nov. 1, 2005

(65) Prior Publication Data

US 2006/0194893 A1    Aug. 31, 2006

Related U.S. Application Data

(60) Provisional application No. 60/623,916, filed on Nov. 1, 2004.

(51) Int. Cl.
*C04B 28/02* (2006.01)
*C08J 9/00* (2006.01)
*C08J 9/36* (2006.01)

(52) U.S. Cl. ............... 521/55; 521/50; 521/53

(58) Field of Classification Search .............. 521/64, 521/87, 88, 50, 53, 55
See application file for complete search history.

(56) References Cited

U.S. PATENT DOCUMENTS

| | | | |
|---|---|---|---|
| 4,540,717 A | 9/1985 | Mahnke et al. | |
| 4,666,948 A | 5/1987 | Woerner et al. | |
| 5,322,915 A | 6/1994 | Weiser et al. | |
| 5,824,421 A | 10/1998 | Kobayashi et al. | |
| 6,268,423 B1* | 7/2001 | Mayer et al. | 524/492 |
| 6,350,511 B2 | 2/2002 | Thom et al. | |
| 6,607,817 B1 | 8/2003 | Imashiro et al. | |
| 6,800,666 B2* | 10/2004 | Hahnle et al. | 521/64 |
| 6,828,354 B2 | 12/2004 | Hahnle et al. | |
| 2005/0049321 A1* | 3/2005 | Baumgartl et al. | 521/50 |

FOREIGN PATENT DOCUMENTS

WO        WO 02/26871        *    4/2002

OTHER PUBLICATIONS

Europlasma NV, Hydrophobisation of Basotect-Foam, Article, Oct. 19, 2005, Europlasma NV website, De Bruwaan 5D, 9700 Oudenaardem, Belgium.

* cited by examiner

*Primary Examiner*—Mark Eashoo
*Assistant Examiner*—Melissa Winkler
(74) *Attorney, Agent, or Firm*—RatnerPrestia

(57) ABSTRACT

Melamine foams exhibiting a very low level of water absorption and low residual formaldehyde are provided. The foams may be prepared by repeatedly soaking a melamine foam with an aqueous polysiloxane emulsion and squeezing out the emulsion, followed by a drying step and then a high-temperature annealing step.

22 Claims, 1 Drawing Sheet

HYDROPHOBATION OF MELAMINE FOAM

CROSS REFERENCE TO RELATED APPLICATIONS

This application claims the priority benefit of Provisional U.S. Patent Application No. 60/623,916, filed Nov. 1, 2004.

FIELD OF THE INVENTION

This invention relates to melamine foams. More particularly, it relates to melamine foams having low levels of residual formaldehyde and high resistance to water absorption.

BACKGROUND OF THE INVENTION

Melamine foam has a very fine pore reticulated structure, and is typically hygroscopic and hydrophilic. Under high humidity conditions, the foam may absorb moisture, and some degree of dimensional change can take place. In environments where the product is exposed to water and water based fluids, it readily absorbs these fluids. Melamine foam also contains residual retained formaldehyde, which can be released over time, especially in the presence of liquid water or high atmospheric humidity.

Melamine foams are highly temperature resistant, and can typically withstand temperatures up to 375° F. in continuous service. The product produces extremely low smoke and flame levels and is suitable for use in architectural and aerospace type applications. The byproducts of combustion have very low toxicity.

Unfortunately, the typically hygroscopic nature of many prior art melamine foams makes them unsuitable for use in a number of applications, such as for example pressurized aircraft applications where significant condensation occurs at elevated altitudes. This becomes particularly problematic when considering the material for use as fuselage insulation. Similarly, the residual formaldehyde is a negative attribute that causes the product to be unsuitable in many applications, such as automobile interiors.

There is thus still a need for a melamine foam product that is hydrophobic rather than hydrophilic, and exhibits reduced formaldehyde release.

SUMMARY OF THE INVENTION

In one aspect, the invention provides a foamed polymeric material comprising an open-cell melamine foam having distributed therein a polysiloxane, wherein the material has a residual formaldehyde level of less than 20 ppm.

In another aspect, the invention provides a method of making a foamed polymeric material, comprising contacting an open-cell melamine foam with an aqueous polysiloxane emulsion, drying the foam, and annealing the foam at a temperature in a range of 250° F.-550° F. for a period of time sufficient such that the foamed polymeric material absorbs at most 100 wt % of water relative to the weight of the foam, when measured by a three-plane dive test.

In another aspect, the invention provides a foamed polymeric material made by the method in the immediately preceding paragraph.

DETAILED DESCRIPTION OF THE INVENTION

Figure 1:
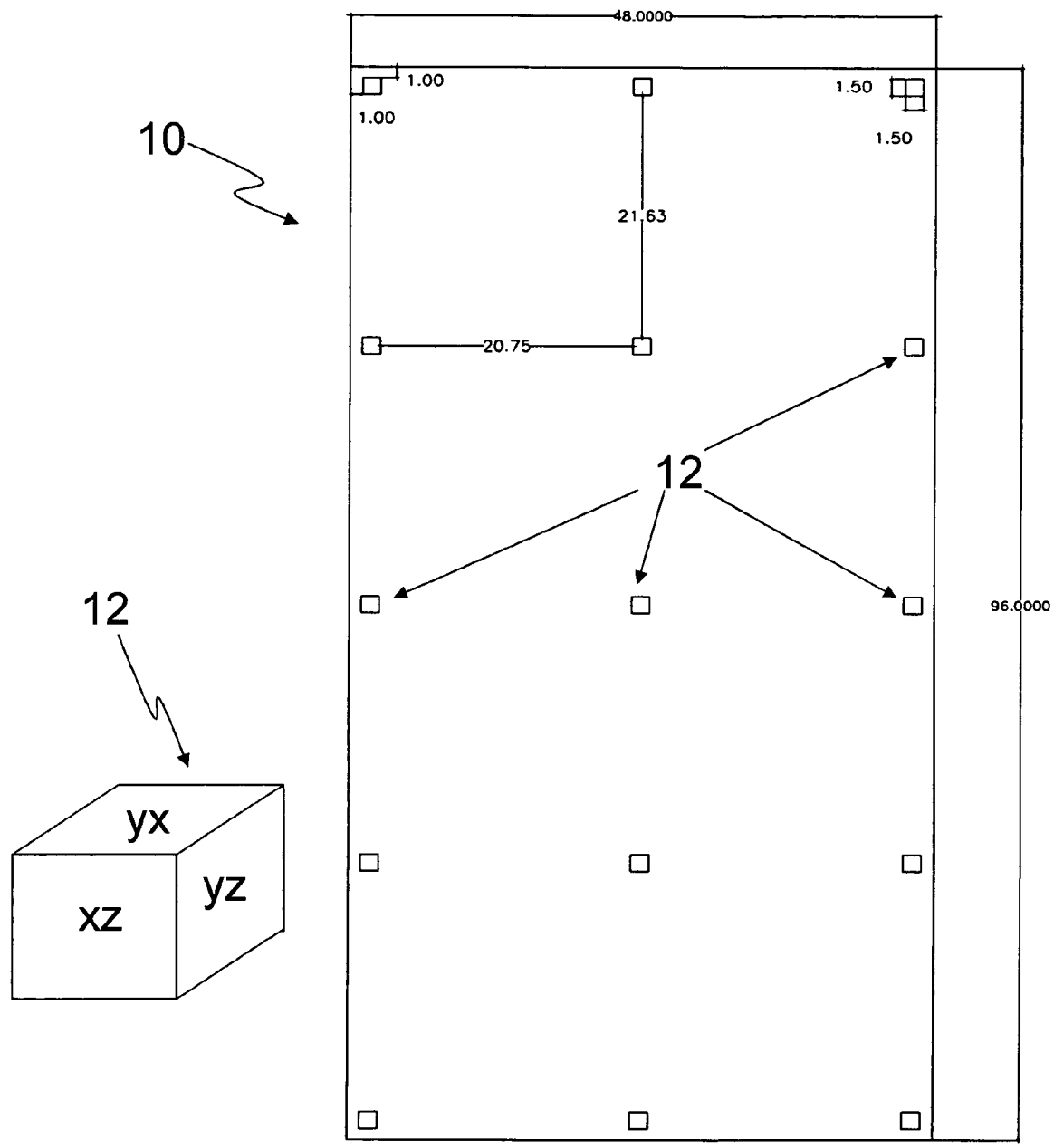
FIG. 1 illustrates a pattern for taking samples of treated foam, according to one aspect of the invention.

The compositions and methods of the present invention convert the naturally hygroscopic melamine foam to a hydrophobic one. The process also typically softens the foam, making it less brittle, while maintaining good performance relative to acoustical, thermal, flame, smoke and toxicity properties. The process also greatly reduces the concentration of retained formaldehyde. The resulting product is a melamine foam sheet that exhibits extremely low water absorption and release of residual formaldehyde.

The properties imparted in the foam are extremely uniform and consistent throughout the thickness of the material, allowing facile cutting and working of the sheets. This facilitates the additional fabrication of the material, allowing small fabricated parts to be produces while maintaining excellent hydrophobic properties.

The method of making the foam involves treating a melamine foam with an aqueous polysiloxane emulsion, followed by drying the foam to remove water. It has been found, however, that merely drying the foam after treatment with the siloxane emulsion is not sufficient to provide the excellent hydrophobicity achieved according to the invention. Rather, a high temperature treatment, referred to herein as "annealing", is required to realize the improvement in hydrophobicity. This treatment also results in the foam exhibiting a low residual formaldehyde level. Details of this process will now be disclosed, followed by a discussion of the raw materials used in the process.

Treatment of the Foam

In accordance with this invention, melamine sheets are immersed in an emulsion of polysiloxane and water. One suitable embodiment of the process employs an aqueous bath containing from 0.125 wt % to 0.375 wt % of polysiloxane, typically from 0.125 to 0.25 wt %, in the form of an emulsion. In some embodiments, SITREN 595 (available from Goldschmidt division of Degussa AG of Düsseldorf, Germany) is used for making the emulsion, by dilution with water. The polysiloxane water emulsion is continuously agitated during the process, and the emulsion is replenished at such a rate as to keep the polysiloxane concentration in the bath relatively constant.

The melamine sheets are typically immersed in the emulsion until saturated, as indicated by the sheets sinking to the bottom of the treatment tank. Once saturated, the sheets are squeezed dry, for example by passing through a nip formed by a pair of rollers. For a melamine foam sheet originally 6 inches thick, the nip is typically set to compress the wet sheet to a thickness of about 0.3 inches. Typically, substantially all of the emulsion is squeezed out during this process.

The sheets are carried through the immersion and nipping process a number of times, resulting in the emulsion being repeatedly hydraulically manipulated into and throughout the foam. The purpose of this multiple mechanical manipulation is to ensure adequate soaking and saturation of the foam and to avoid the natural channeling that tends to occur in this material. For a 6-inch thick foam sheet, four immersion/squeeze cycles has generally been shown to be sufficient to achieve good permeation of emulsion into the foam, but fewer or more cycles may be used.

After manipulation, the foam is subjected to a final squeeze selected to cause between about 0.0015 to 0.0018 lbs/inch$^3$ of emulsion to remain in the foam. For a typical 50"×96"×6" sheet of melamine foam, this is about 45 to 50 pounds of emulsion. After drying, there is typically from 0.0002 to 0.0008 lb/in³ of polysiloxane in the foam, in the form of free polysiloxane and/or polysiloxane bound to the foam.

The sheets are then dried by (typically by heating, although forced air or vacuum drying may also be used) until their weight is substantially the same as prior to the immersion/squeeze steps. For example, a 50"×96"×6" sheet placed in a batch re-circulating hot air oven at 450° F. for about 10 hours typically achieves the desired degree of dryness. It should be noted that time may vary considerably depending on the exact temperature, the thickness of the foam sheet, the particular composition of the foam and the polysiloxane emulsion, and perhaps other factors. Alternatively, the sheets can be processed through a continuous radio frequency drying system and dried in a much shorter time, or can be dried in an oven at more moderate temperatures (even ambient), optionally at reduced pressure. It will be appreciated that various methods of drying can achieve the same level of final water content, and any of these is suitable according to the invention. As a general rule, drying is typically sufficiently complete when the length of the foam piece, which usually increases by about 3% during the immersion/squeeze cycles, returns to a value equal to about 98% of the pre-treatment length.

The final step is to heat the sheets for an additional time period after drying in order to fully develop the sheet's hydrophobicity. This step is referred to herein as an "annealing" step. Annealing must be performed at an elevated temperature and for a sufficient amount of time, in order to obtain the improved hydrophobicity provided by the invention. A suitable temperature and length of time for annealing a typical 50"×96"×6" melamine sheet is generally between about 3 and 5 hours at 450° F. Annealing is typically performed at a minimum temperature of 250° F., more commonly at least 300° F., and most commonly at least 400° F. The upper limit of annealing temperature is determined mainly by the temperature at which thermal degradation of the foam becomes a problem, and this varies somewhat depending on the exact composition of the foam and the polysiloxane emulsion used for the treatment. Typically the upper limit is 550° F., and more typically about 500° F. As a general rule, annealing is complete when the length of the foam sheet is 95% or less of the length of the sheet before treatment.

Some routine experimentation is typically useful in optimizing drying and annealing conditions. Optimal time and temperature conditions may be determined by measuring the amount of water uptake by a sample of the foam, according to the three-plane dive test described in the Examples section. Successful annealing typically results in a weight gain of at most 100%, more typically at most 50%. In most cases, the weight gain is at most 35%, and in many cases at most 25%. By contrast, a typical untreated foam picks up over 100% of water, based on the weight of dry foam, and in many cases the amount is as high as 1000%. It is common for the water pickup levels of untreated foam to be quite variable from piece to piece, but relatively consistent once the treatment has been completed.

As noted above, drying need not be performed at an elevated temperature, but annealing must be. In those cases where both are performed at an elevated temperature, for example at the same temperature, the drying and annealing may be performed sequentially without removal from the oven or other drying apparatus. However, it must be emphasized that although the temperatures may be the same, the annealing process results in changes to the foam that are distinct from mere drying. The exact nature of these changes is not known, but they may for example be physical and/or chemical changes in the polysiloxane and/or the melamine foam substrate, changes of location of the polysiloxane in the foam, or all of these. The annealing also significantly reduces the level of residual formaldehyde relative to that of the pre-treatment foam.

An important characteristic of treated foams according to the invention is a very low level of residual formaldehyde. Residual formaldehyde is typically less than 20 ppm, and more typically less than 10 ppm, as measured by VDA 275, a standard method used in the European auto industry. Typically, the treated foam contains at most 20% of the amount of residual formaldehyde found in the untreated foam.

In an alternative embodiment of the invention, the annealing step may be performed before the foam is treated with the polysiloxane emulsion. In that case, only a drying step may be required after treatment with the emulsion.

Untreated Melamine Foam

Melamine foams for use according to the invention include any such products known in the art. Typical melamine foams are low-density, cellular materials manufactured by heating a melamine-formaldehyde precondensate, an emulsifier, a blowing agent, and a curing agent, typically by use of microwave energy. Other ingredients may also be included in the foam-forming reaction mixture, and a number of examples may be found in U.S. Pat. No. 4,540,717 to Mahnke, the specification of which is incorporated herein by reference. Foams for use in this invention may include those incorporating such optional ingredients, as well as ones that do not. Foams of any density may be used according to the invention, with typical exemplary foams having a density of approximately 0.3-0.8 lb/ft³, (4.8-12.8 g/L), more commonly 0.5-0.7 lb/ft³ (8.0-11.2 g/L), and typically 0.6 lb/ft³ (9.6 g/L).

Melamine foams for use in this invention may also be post-treated, i.e. treated at some point after foam formation is substantially complete, with any of a variety of surface-modifying materials capable of improving the hydrophobicity and/or reducing the hygroscopicity of the foam. However, certain post-treatment materials may have the opposite effect, i.e., they may tend to increase absorption of water. Therefore, in some embodiments, the foams of this invention are essentially free of such materials and their reaction products, if any. Examples of materials that may be excluded include polyamines, polyamides comprising multiple amine functionality (such as lysine condensates), phenols, and polymers comprising (meth)acrylic acid (or salts thereof) repeat units. Other additives from which the treated foam may optionally be essentially free include compounds added to an already substantially-formed foam, and which reduce residual formaldehyde content, especially to a level of less than 20 ppm.

Open-cell reticulated foams are used in the practice of this invention, since these provide good insulating and sound deadening performance in a number of applications, such as aircraft insulation, and since they are capable of taking polysiloxane emulsions into their porous structures. Suitable melamine foams are available from BASF Aktiengesellschaft of Ludwigshafen, Germany, under the trade names BASOTECT Type G and BASOTECT Type V3012.

Polysiloxane Emulsion

Suitable polysiloxane emulsions include any polysiloxane known or used in the art, including for example those used as release agents. Low-viscosity, medium viscosity, high-viscosity, and ultrahigh-viscosity polysiloxanes may be used, with or without a surfactant. If a surfactant is used, it may be nonionic, anionic, or cationic. Polydimethylsiloxanes may be used, as well as other alkyl polysiloxanes and alkylaryl polysiloxanes. The polysiloxanes may optionally be functionalized with any functional group known in the polysiloxane art, including silanol termination or other hydroxyl functionality, or amine groups. Nonlimiting examples of suitable polysiloxane emulsions are available from Dow Corning of Midland, Mich., as follows:

DOW CORNING 8 EMULSION non-ionic, 35% active emulsion based on medium viscosity polydimethylsiloxane.

DOW CORNING 347 EMULSION non-ionic, 60% active emulsion of silanol-terminated polydimethylsiloxane fluid.

DOW CORNING 36 EMULSION non-ionic, 35% active emulsion based on medium viscosity polydimethylsiloxane.

DOW CORNING 37 EMULSION anionic, 35% active emulsion based on high viscosity polydimethylsiloxane.

DOW CORNING 346 EMULSION non-ionic, 60% active emulsion based on medium viscosity polydimethylsiloxane.

DOW CORNING HV 490 EMULSION anionic, 35% active emulsion based on high viscosity polydimethylsiloxane.

DOW CORNING 1101 EMULSION anionic, 50% active emulsion based on high viscosity polydimethylsiloxane.

DOW CORNING 290 PAINTABLE RELEASE AGENT non-ionic, 50% active emulsion based on alkylaryl polysiloxane.

DOW CORNING 2-5009 PAINTABLE RELEASE AGENT non-ionic, 50% active emulsion based on alkylaryl polysiloxane.

DOW CORNING 1716 MICROEMULSION cationic, 30% active microemulsion based on high viscosity polydimethylsiloxane.

Other suitable polysiloxane emulsions are available from Goldschmidt division of Degussa AG of Düsseldorf, Germany, as follows.

SITREN 534, 50% aqueous emulsion of a polysiloxane derived from dimethyldichlorosilane and containing $NH_2$ and $OC_2H_5$ substituents.

SITREN 447, 50% aqueous polysiloxane emulsion derived from dimethyldichlorosilane and containing OH functional groups.

SITREN 595, 50% aqueous emulsion of polydimethylsiloxane.

EXAMPLES

Example 1

To assess residual formaldehyde content, standard test method VDA 275 (Verband der Automobilindustrie; association of the automobile industry) was used. The method involves suspending a sample over water in a closed vessel for 3 hours at 60° C., and measuring the formaldehyde absorbed by the water.

Standard gray BASOTECT Type G melamine foam from BASF produced 60 ppm of formaldehyde, using this test, while a sample of the inventive hydrophobic melamine foam using gray BASOTECT Type G as raw material yielded 6 PPM of formaldehyde in the same test protocol.

Hydrophobicity of the foam is gauged by the following test method, referred to herein as the "three-plane dive test," which will now be described.

Sample Preparation:

Samples are prepared according to the diagram in FIG. 1. A 1.5" thick sample sheet is cut from the middle section of a 48"×96"×6" treated sheet, shown generally at 10. Ideally, one horizontal plane of the sheet should approximate the mid plane of the treated sheet. Fifteen 1.5"×1.5" cubes 12 are water-jet cut from each test sheet according to the pattern outlined in FIG. 1, and the YX, XZ and YZ faces marked as shown, with the yx plane being cut so as to be parallel with the 48"×96" surface of treated sheet 10. The pattern shown in FIG. 1 is designed for representative sampling, but other sampling methods may be used to obtain 15 representative 1.5" cubes.

Test Apparatus:

The test apparatus consists of a container, preferably clear Plexiglas or glass, nominally measuring 12"×12"×30" and filled with enough distilled water at ambient temperature to reach a depth of at least 8½". The apparatus is equipped with a sample holder, such as a wire mesh, that is designed to allow free permeation of water and to allow the sample to be submerged in the tank such that the top of the sample rests approximately 3" below the surface of the water.

Procedure:

A pre-weighed sample is placed in the apparatus with the XY plane facing up, and submerged and held under the distilled water bath for 30 seconds. The sample is removed from the water and turned so that the ZX plane is facing up, and the sample is again submerged for 30 seconds. The sample is again removed and turned so that the ZY plane is facing up, and again submerged for 30 seconds and then removed, after which the sample is blotted dry with a paper towel and weighed to determine by difference the amount of water absorbed. Results from 15 cubes are averaged to calculate the percent weight gain due to water absorption.

Comparative Example 2

A 10"×10"×2" melamine foam block was treated as follows. The block was submerged in a 0.5% aqueous bath of SITREN 595 emulsion (0.25 wt % polysiloxane content) for five minutes, after which it was rolled under compressing conditions forward and backward four times in the bath to impregnate the melamine foam with liquid. To ensure complete impregnation, the block was flipped upside down in the bath and rolled forward and backward another four times. The block was removed from the bath and rolled forward and backward two times, flipped, and rolled two more times to remove excess emulsion. The block was then dried at 400° F. until its weight was the same as prior to treatment, indicating dryness.

A modification of the three-plane dive test was used to assess the hydrophobicity of the block, as follows. Four pieces were cut from the block, measuring 3.75"×3.75"×2", and each was weighed and then submerged in water for 30 seconds with one of the square surfaces of the block facing down. The pieces were removed, blotted dry, and weighed again to determine water pickup. The process was repeated two more times (a total of three blocks). The first block had an average water pickup of 403% (range 317-488%), the second had 2572% pickup (range of 1403-3848), and the third had 2576% pickup (range of 1288-4260). As noted herein above, and as shown here, water pickup for treatment without annealing can be highly variable.

Example 3

The procedure of Example 2 was repeated, but after drying the blocks were annealed for three hours at 400° F. The first block had an average water pickup of 74% (range 69-83%), the second had 95% pickup (range of 88-103), and the third had 86% pickup (range of 80-95). Thus, the annealing step resulted in a profound improvement in hydrophobicity in the melamine foams treated according to the invention.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A foamed polymeric material comprising an open-cell melamine foam having distributed therein a polysiloxane, wherein the material has a residual formaldehyde level of less than 20 ppm and wherein the material absorbs at most 100 wt % of water relative to the weight of the material when measured by a three-plane dive test.

2. The foamed polymeric material of claim 1, wherein the residual formaldehyde level is at most 20% of a residual formaldehyde level of an analogous open-cell melamine foam not treated with a polysiloxane.

3. The foamed polymeric material of claim 1, wherein the material has a density in a range from 0.3 to 0.8 lb/ft$^3$.

4. The foamed polymeric material of claim 1, wherein the material has a density in a range from 0.5 to 0.7 lb/ft$^3$.

5. The foamed polymeric material of claim 1, wherein the material absorbs at most 35 wt % of water relative to the weight of the material when measured by a three-plane dive test.

6. The foamed polymeric material of claim 1, wherein the material comprises from 0.0002 to 0.0008 lb/in$^3$ of polysiloxane.

7. The foamed polymeric material of claim 1, wherein the polysiloxane comprises polydimethylsiloxane.

8. The foamed polymeric material of claim 1, wherein the material is essentially free of polyamines, polyamides comprising multiple amine functionality, phenols, polymers comprising (meth)acrylic acid repeat units or salts thereof, and reaction products of any of these.

9. A method of making a foamed polymeric material, comprising contacting an open-cell melamine foam with an aqueous polysiloxane emulsion, drying the foam, and annealing the foam at a temperature in a range of 250° F.-550° F. for a period of time sufficient such that the foamed polymeric material absorbs at most 100 wt % of water relative to the weight of the foam, when measured by a three-plane dive test.

10. The method of claim 9, wherein the period of time is sufficient such that a residual formaldehyde level in the material is less than 20 ppm.

11. The method of claim 9, wherein the period of time is sufficient such that a residual formaldehyde level in the material is less than 10 ppm.

12. The method of claim 9, wherein the residual formaldehyde level is at most 20% of a residual formaldehyde level the open-cell melamine foam immediately prior to said contacting.

13. The method of claim 9, wherein the material has a density in a range from 0.3 to 0.8 lb/ft$^3$.

14. The method of claim 9, wherein the material has a density in a range from 0.5 to 0.7 lb/ft$^3$.

15. The method of claim 9, wherein the material absorbs at most 35 wt % of water.

16. The method of claim 9, wherein the polysiloxane emulsion is of a concentration sufficient to provide in the foamed polymeric material from 0.0002 to 0.0008 lb/in$^3$ of polysiloxane.

17. The method of claim 9, wherein the polysiloxane constitutes from 0.125 wt % to 0.375 wt % of the emulsion.

18. The method of claim 9, wherein the polysiloxane comprises a polydimethylsiloxane.

19. The method of claim 9, wherein the annealing is performed in a range from 350° F.-500° F.

20. The method of claim 9, wherein the annealing is performed in a range from 400° F.-500° F.

21. A foamed polymeric material made by the method of claim 9.

22. The foamed polymeric material of claim 1, wherein the residual formaldehyde level is less than 10 ppm.

* * * * *